United States Patent [19]

Stevens

[11] Patent Number: 5,371,621
[45] Date of Patent: Dec. 6, 1994

[54] SELF-ROUTING MULTI-STAGE PHOTONIC INTERCONNECT

[75] Inventor: Rick Stevens, Apple Valley, Minn.

[73] Assignee: Unisys Corporation, Blue Bell, Pa.

[21] Appl. No.: 110,365

[22] Filed: Aug. 23, 1993

[51] Int. Cl.⁵ ............................................. H04J 14/00
[52] U.S. Cl. ..................................... 359/117; 359/128; 359/139; 385/24
[58] Field of Search .................... 359/109, 117–118, 359/139, 164, 165; 385/16–17, 24; 370/58.2

[56] References Cited

U.S. PATENT DOCUMENTS

| | | | |
|---|---|---|---|
| 3,710,348 | 1/1973 | Craft | 340/172.5 |
| 4,701,913 | 10/1987 | Nelson | 370/110.1 |
| 4,731,878 | 3/1988 | Vaidya | 455/600 |
| 4,736,462 | 4/1988 | Joel, Jr. | 359/164 |
| 4,771,419 | 9/1988 | Graves et al. | 370/58 |
| 4,975,906 | 12/1990 | Takiyasu et al. | 370/85 |
| 5,058,206 | 10/1991 | Born et al. | 359/164 |
| 5,144,622 | 9/1992 | Takiyasu et al. | 370/85 |
| 5,168,572 | 12/1992 | Perkins | 395/800 |
| 5,175,777 | 12/1992 | Böttle | 385/17 |
| 5,181,017 | 1/1993 | Frey, Jr. et al. | 340/825 |
| 5,191,626 | 3/1993 | Stern | 385/24 |
| 5,241,409 | 8/1993 | Hill et al. | 359/117 |
| 5,303,077 | 4/1994 | Böttle et al. | 385/17 |

Primary Examiner—Richard E. Chilcot, Jr.
Assistant Examiner—Kinfe-Michael Negash
Attorney, Agent, or Firm—Nawrocki, Rooney & Sivertson

[57] ABSTRACT

An apparatus and method for transferring data messages between a sending station and a receiving station through a photonic multi-stage interconnect network (MIN). The MIN has a plurality of switches in each stage and has a plurality of inputs and outputs. Each output of each switch is connected to one of the inputs on each switch in the next succeeding stage of the interconnect device. The sending station or terminal selects a plurality of routing messages, one routing signal for each stage of the MIN, and also sends a data message or signal to a selected receiving terminal. Each routing message is sacrificial and thus ends at the stage of the MIN where it actually operates on a switch. After all routing messages are sent, one for each stage of the MIN, a path exists to the receiving station and the data message or signal is transferred.

9 Claims, 7 Drawing Sheets

SELF-ROUTING MULTI-STAGE PHOTONIC INTERCONNECT

CROSS REFERENCE TO CO-PENDING APPLICATIONS

U.S. patent Ser. No. 07/958,148, filed Oct. 7, 1992, for EXTENDED DISTANCE FIBER OPTIC INTERFACE in the name of N. Patel and, U.S. patent Ser. No. 07/912,972, filed Jul. 10, 1992, for FIBER OPTIC BUS AND TAG ADAPTER FOR BLOCK MULTIPLEXER CHANNEL in the name of N. Patel are assigned to the assignee of the present invention and are incorporated herein by reference.

BACKGROUND OF THE INVENTION

1. Field of the Invention

The present invention generally relates to transfers of data between data origination stations and data reception stations through a network such as a multi-stage interconnect network and more particularly relates to transfers of data which may utilize a fiber optic transmission medium.

2. Description of the Prior Art

It has been known for some time to transfer digital data messages between a data origination or sending station and any one of a plurality of message receiving terminals through a message routing device. Those of skill in the art will be familiar with a number of systems which use electrical modes of data transfer. U.S. Pat. Nos. 4,975,906 and 5,144,622, issued to Takiyasu et al. discuss a local area network (LAN) approach. Somewhat more recently, optical media have been employed for the transmission of digital information.

U.S. Pat. No. 3,710,348, issued to Craft, discusses the design and use of standardized interconnect modules. Each of the modules provides circuitry for the conversion of signals to and from external transmission lines and to and from internal logic levels. The modules utilize internal storage arrays for buffering of data and provide circuitry for handling control signals which are transmitted separately from the data signals. Additional circuits are used to provide parity generation and checking features.

The major problems associated with the Craft technique result in relatively slow communication between the sender and receiver even though the standardized interface may yield some system level advantages. U.S. Pat. No. 5,168,572, issued to Perkins, gives the promise of greater speed by employing a technique suitable for use with optical media. The buffering feature is eliminated with the general purpose switching elements providing optical paths for multiple levels of switching. However, separate paths are required for control of the switching elements. Similarly, U.S. Pat. No. 4,731,878, issued to Vaidya teaches the need for separate electrical control circuitry to route optical data streams.

An alternative approach is shown in U.S. Pat. No. 5,175,777, issued to Boettle. With this technique, the data signals are transmitted over shared pathways using wavelength division multiplexing. However, separate signal paths are required for control signals with the implication that these paths are electrical in nature, which is similar to the Vaidya approach. The control and data information are packed into the same packets in the electrical system of U.S. Pat. No. 4,771,419, issued to Graves et al. Unfortunately, by packing the control and data information together, the entire message must be buffered within each of the switch elements to permit the switch element to unpack the routing information. This introduces significant delays into the transmission process and necessitates substantially more hardware to implement. U.S. Pat. No. 4,701,913, issued to Nelson, similarly requires buffering of the message.

SUMMARY OF THE INVENTION

The present invention overcomes disadvantages found in the prior art by providing an improved optical multi-stage self-routing interconnect apparatus and method which provides for the use of a system of data transfer apparatus which can select a data path between a sending and receiving station through its transfer network without the use of separate paths for control signals or buffering of the data.

A key feature of the present invention is the transfer of the switching control signals over the same information paths as the data signals. Significant amounts of hardware are eliminated in this fashion, because each connection thus requires only a single interface for both data transmission and control. This advantage is particularly beneficial when considering that the prevalent means for transferring control signals in the prior art employs the electrical medium even though the data may be transmitted optically. When used in non-blocking, multi-stage interconnect network (MIN), as in the preferred mode, this automatically ensures coincidence of control and data signal paths.

To implement the preferred mode of the present invention, switching control signals for routing are packed as sacrificial routing messages. These routing messages are utilized by the initial, intermediate, and terminal switch elements for routing of the associated data signals, with one routing message being dedicated to each stage within the routing path. The routing messages are sacrificial in that each is absorbed by the switching element at the corresponding stage without providing it to the next succeeding stage or the system user. The result appears transparent. Even though there is a slight amount of transmission path band pass consumed through transmission of the sacrificial routing packets, system band pass is not reduced, because the time required to activate the switch at each stage is overlapped by the transmission of the corresponding routing message.

Because of this overlap, the data message on the single data path is in effect delayed by an amount of time needed to complete the switching function at each stage. As a result, no buffering of the data is needed at any of the intermediate stages of the switching network. In this way the switching process occurs in real time at each stage. Sacrificing of the routing message at each stage effectively shortens the total transmission time to each of the succeeding stages.

As implemented in the preferred mode, the individual crossbar switching elements are active in nature. Therefore, the number of stages within the switch is not limited by transmission losses. However, each additional stage does add a corresponding propagation delay.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
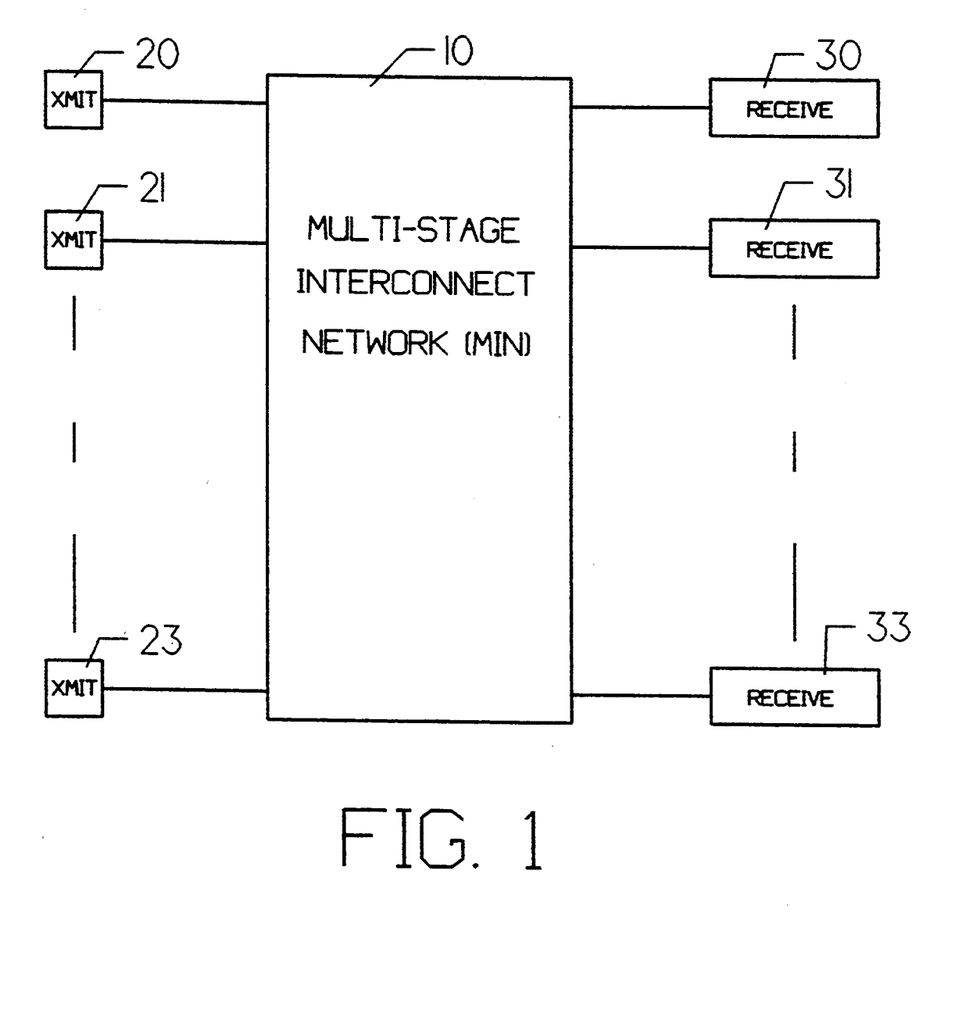
FIG. 1 is a block diagram showing the basic apparatus of this invention.

FIG. 1 is a block diagram of the apparatus of this invention showing a photonic multi-stage interconnect network (MIN) 10. Min 10 is connected to receive input signals for both routing and information messages from any one of a plurality of sending stations or terminals such as terminals 20, 21 and 23. A first sending station is shown at 20, a second station is shown at 21, and an nth station is shown at 23. MIN 10 is also connected to provide output signals for information messages to a plurality of receiving stations or terminals 30, 31 and 33. A first receiving station is shown at 30, a second station is shown at 31, and an nth receiving station is shown at 33.

As will be more fully described below, the routing signals received by MIN 10 from any one of stations 20, 21 and 23 are sacrificial control signal packets. These control signal packets are utilized by MIN 10 to route the associated data signals within MIN 10 and are then destroyed (i.e. not propagated beyond MIN 10). Thus the only signals presented by MIN 10 to a selected one of stations 30, 31 and 33 are information message signals.

Figure 2:
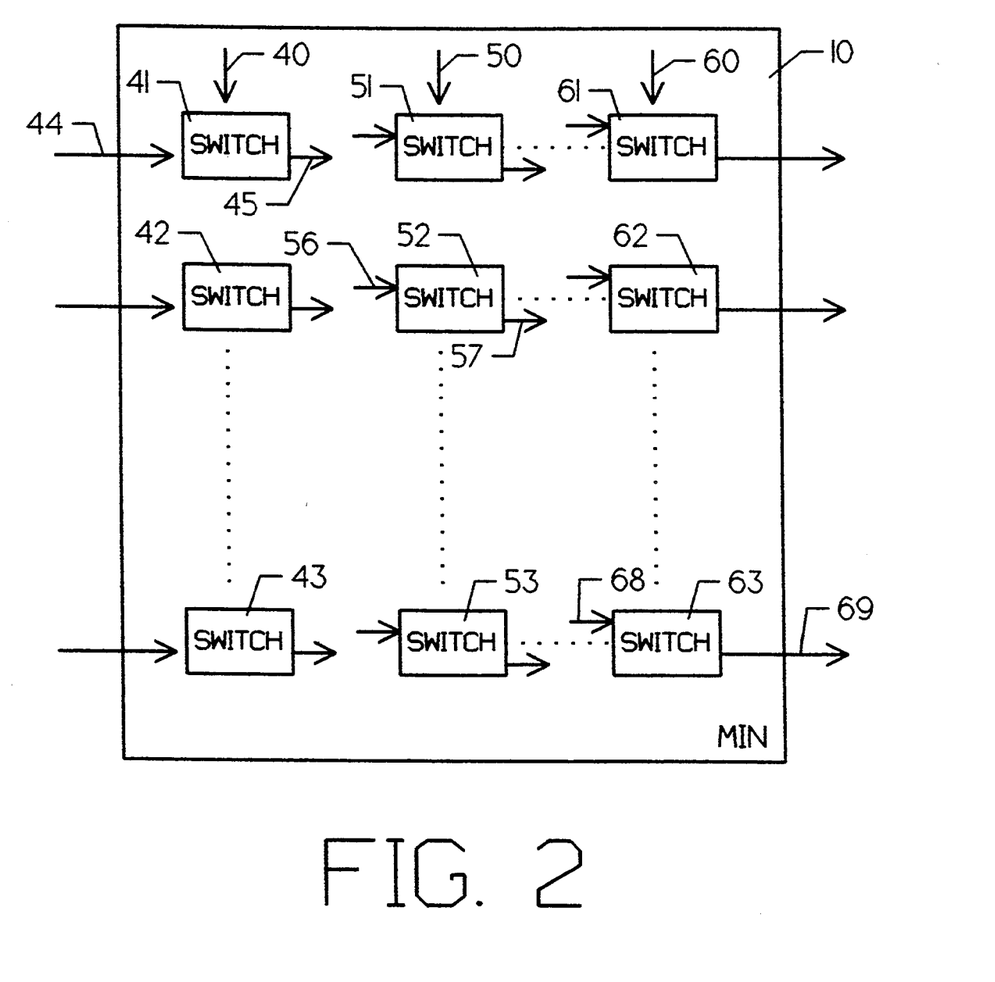
FIG. 2 is a block diagram showing a multi-stage interconnect network (MIN) for use in this invention.

FIG. 2 shows MIN 10 in block diagram form. Min 10 includes a plurality of switching stages, wherein each stage contains a plurality of switch elements. A first stage 40 includes a first switch element 41, a second element 42 and an nth element 43. A second stage 50 of MIN 10 includes a first element 51, a second element 52 and an nth element 53. A third stage 60 of MIN 10 includes a first element 61, a second element 62 and an nth element 63.

Each of switch elements 41-43, 51-53 and 61-63 has a plurality of input and output connections, more specifically described below and shown in FIG. 3. For example, in FIG. 2, line 44 depicts a connection between an output of one of the plurality of sending stations such as station 20 in FIG. 1 and one of the plurality of inputs of element 41 of stage 40. Line 45 depicts the connection of one of the plurality of outputs of element 41 routed to, for example, input line 56 connected to one of the plurality of inputs on element 52 of stage 50. Line 57 depicts the connection of one of the plurality of outputs on element 52 to, for example, input line 68 connected to one of the plurality of inputs on element 63 of stage 60. Finally, line 69 depicts a connection between one of the plurality of outputs on switch 63 and one of the receiving stations such as station 33 (see also FIG. 1).

The pattern for routing information messages through MIN 10 broadly described above is repeated in specific detail below and is more completely shown in FIG. 6.

Figure 3:
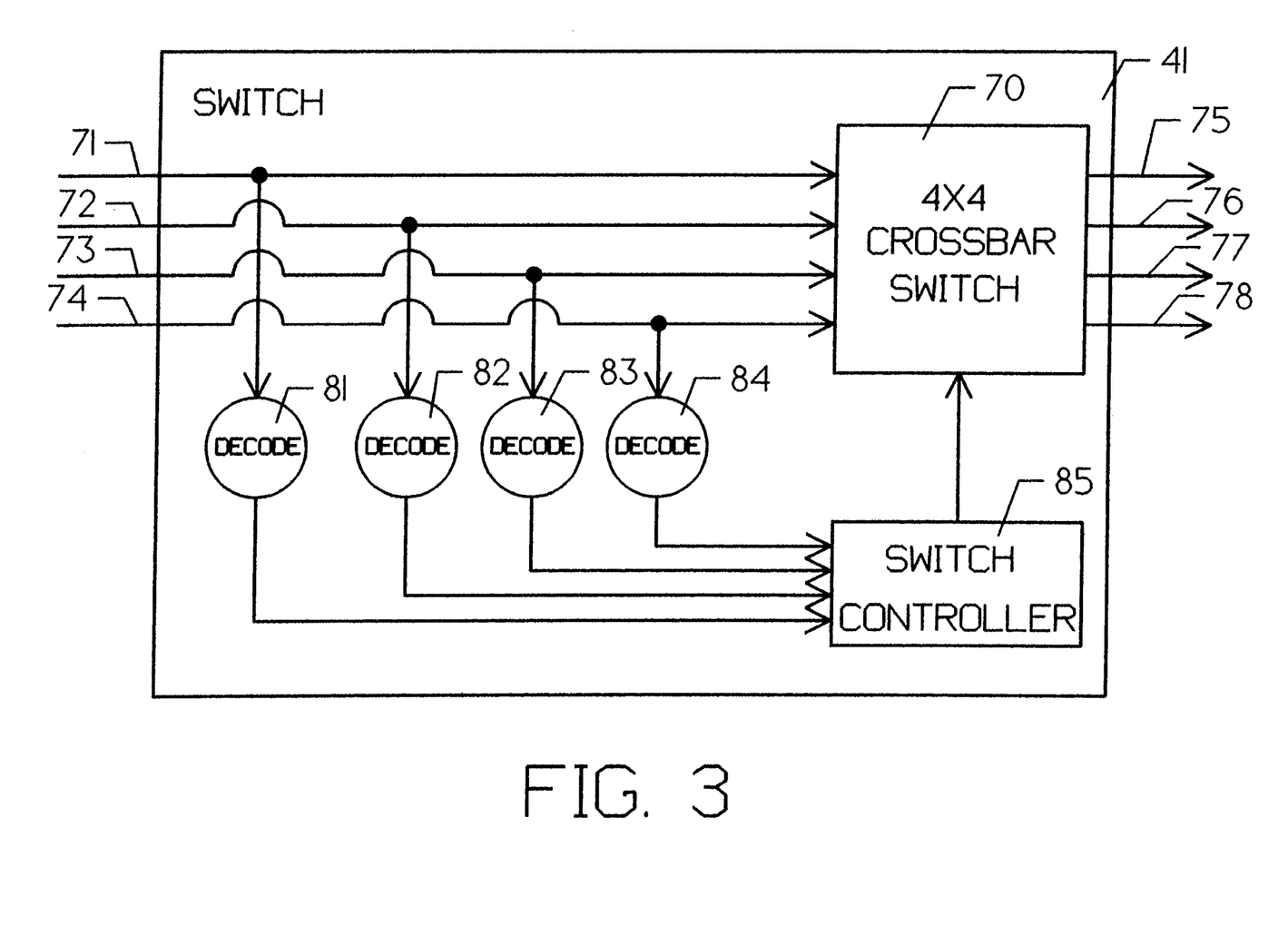
FIG. 3 is a diagram of an individual switch element of the type to be used in the MIN of FIG. 2.

FIG. 3 shows a block diagram of a switch element such as element 41 of FIG. 2. Element 41 includes a four-by-four crossbar switch 70. Preferably switch 70 is a 4×4 Active Photonic Crossbar Switch available from McDonnell Douglas Electronic Systems Company —Lasers and Electronic Systems, MC 111—1221, Box 516, St. Louis, Mo. 63134—0516. However, similar devices are available from Photonic Integrated Research, Inc., Allied Signal, Inc., and other similar suppliers.

Switch 70 has a plurality of inputs 71, 72, 73 and 74. Element 70 also has a plurality of outputs 75, 76, 77 and 78. Input 71 is connected to a decoder 81. Input 72 is connected to a decoder 82. Input 73 is connected to a decoder 83. Input 74 is connected to a decoder 84. Each of decoders 81-84 is connected to the input of a switch controller 85, which controller 85 is connected to crossbar switch 70. Decoders 81-84 covert the control signals of the sacrificial packets into electrical signals for use by switch controller 85.

When an operator of one of sending stations 20, 21 or 23 decides on a routing path, the routing signals appear on one of inputs 71-74 of switch 70, and thus at the corresponding one of decoders 81-84. The decoded output signal is presented to controller 85 as an electrical signal, which responds to the decode algorithm by controlling switch 70 and selecting the desired one or more outputs 75-78. The operator of the sending station will have also sent information message signals to the selected of inputs 71-74, signals will pass through to the selected output(s) 75-78 to be directed to the corresponding input of one or more receiving stations 30, 31 or 33. The routing messages may involve the simple addition of a one of four address to the normal message initiation and termination codes associated with the particular protocol in use as suggested by the above cited prior art documents incorporated herein by reference.

Figure 4:
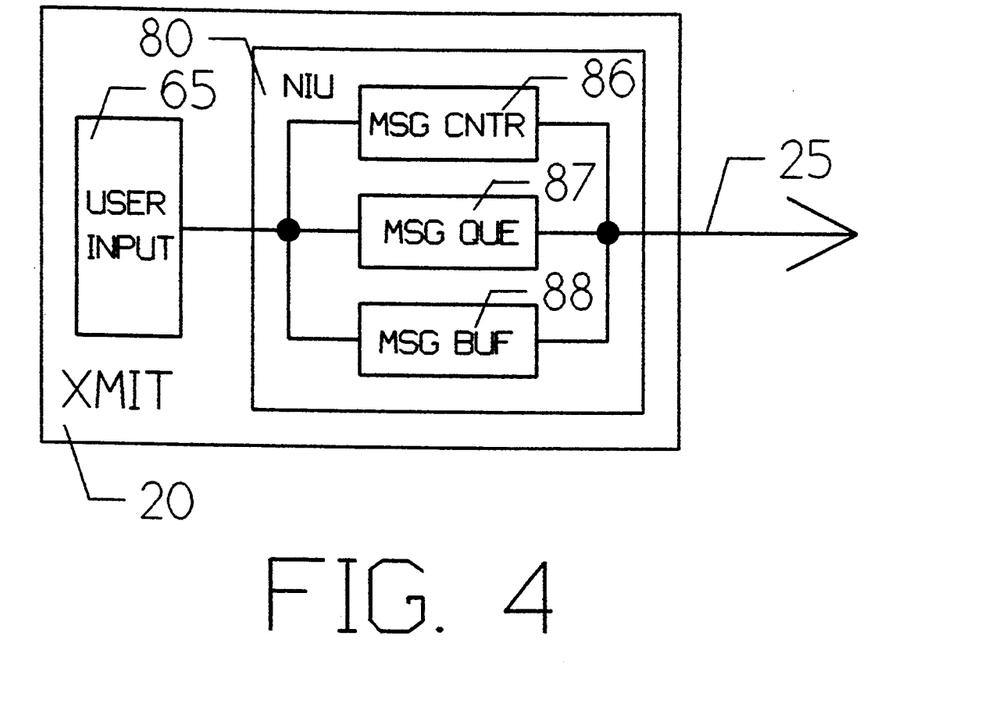
FIG. 4 is a diagram of a message sending station.

FIG. 4 shows a block diagram of the internal structure of sending station 20. Station 20 includes a User's input station 65 which can be any one of several devices, such as a computer, with which the User can enter his information message and select a receiving station such as station 33. The User's input is sent by station 65 to a network interface unit 80 which comprises a route control device 86, a message queue device 87 and a message buffer 88.

If a path to the selected receiving station has already been established, the message from station 65 passes straight through message buffer 88 and MIN 10 to the selected receiving station. If the desired path does not currently exist, or if a path is established to an unselected receiving station, then the data message from station 65 is entered into the message queue device 87 and route control device 86 is activated to provide a path to the selected receiving station. The routing algorithm to be used is determined by switch controller 85. Such routing algorithms are readily known in the art for routing signals through non-blocking, multi-stage switching networks. The type of routing algorithm used is determined by the network application requirements.

Control device 86 generates a number of sacrificial routing messages equal to the number of switching stages. FIG. 2 shows a three stage MIN and therefore three sacrificial routing messages would be used to establish a path from a sending station to a receiving station. These sacrificial routing messages are packed into a sacrificial routing packet immediately preceding the desired message. This combined message is then passed through output line 25 to a corresponding input of MIN 10. The passage of these messages through MIN 10 is described in detail in the discussion of FIG. 6, below.

Figure 5:
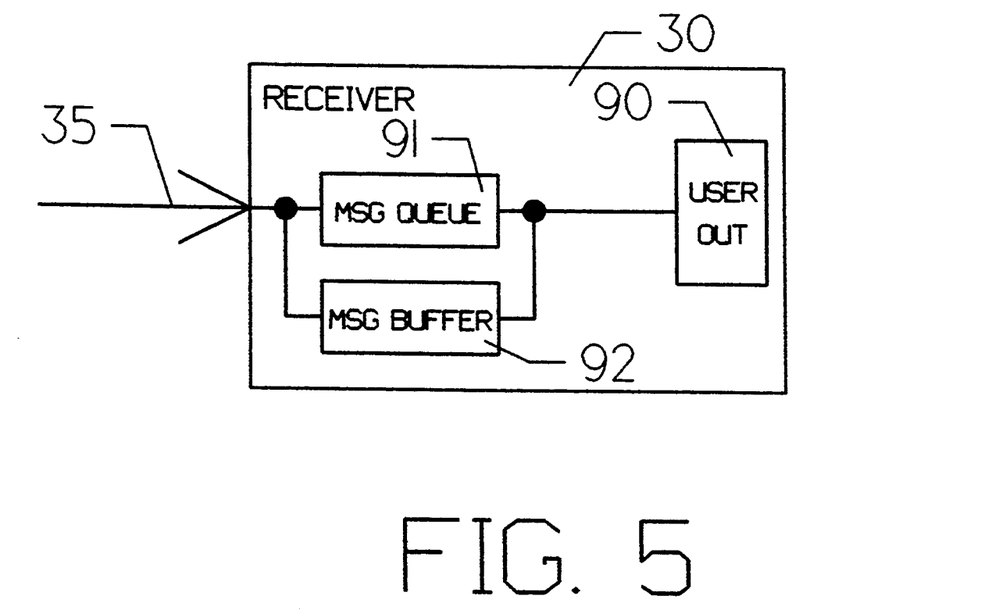
FIG. 5 is a diagram of a message receiving station.

FIG. 5 shows a typical receiving station 30 which includes a User's readout station 90, such as a computer, a message queue device 91, and a message buffer 92. When a message has completed a path through MIN 10, it will be sent on output line 35 to station 30. Note that only the data message arrives at line 35 because the apparatus of this invention uses sacrificial routing signals, as is more fully described in the discussion of FIG. 6, below. Yet only the data portion of the message is actually received by receiving station 30. The message on line 35 will be placed into buffer 92 where it can be read directly to User's station 90, or can be read to message queue device 91 for later viewing by the User.

Figure 6:
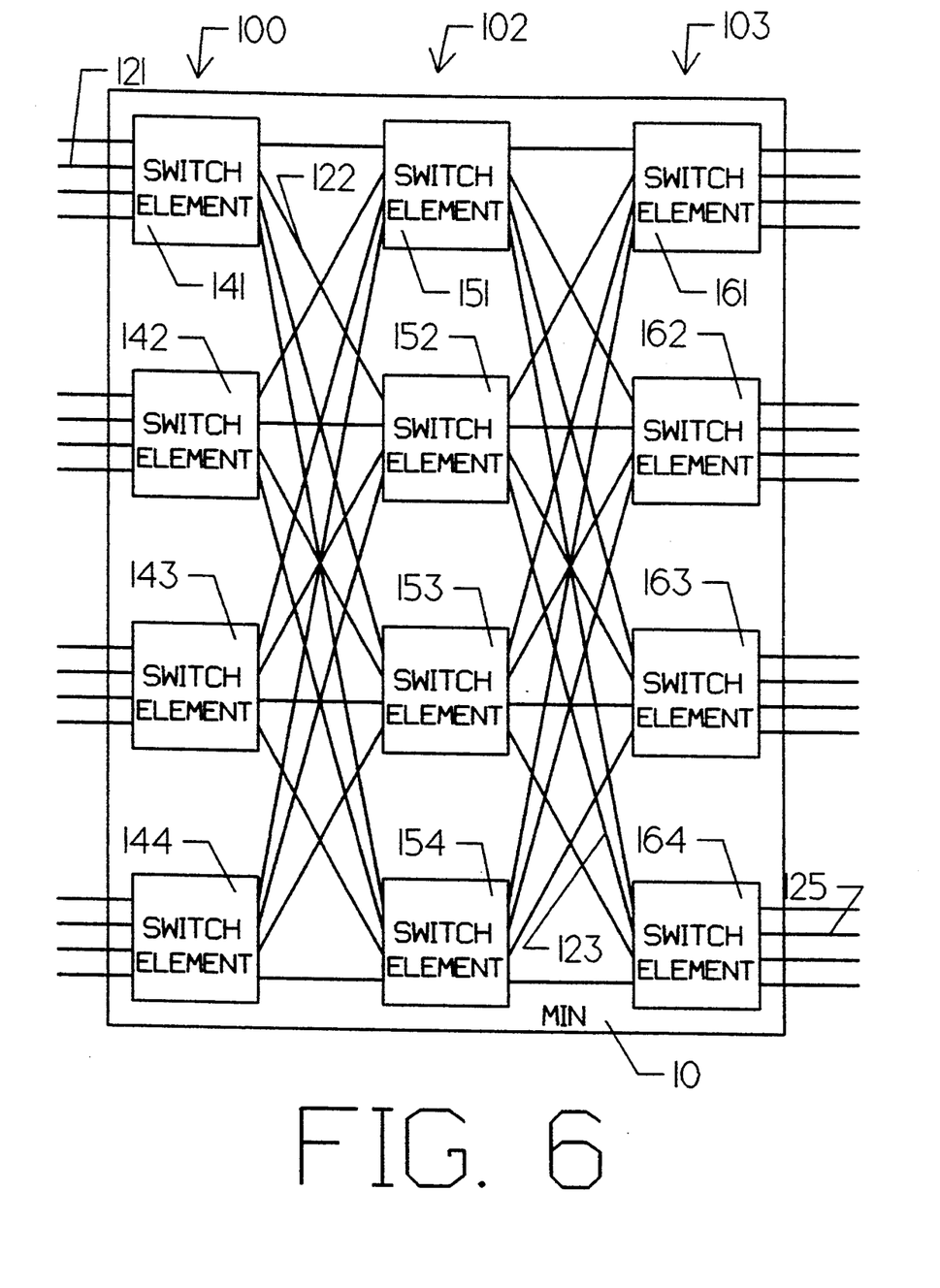
FIG. 6 is a block diagram of a three stage MIN illustrating the operation of the method and apparatus of this invention.

FIG. 6 shows a three stage example of multi-stage interconnect network (MIN) 10. MIN 10 in this example has three stages with four switch elements in each stage. A first stage 100 includes switch elements 141, 142, 143 and 144, a second stage 102 includes switch elements 151, 152, 153 and 154, and, a third stage 103 includes switch elements 161, 162, 163 and 164. Each individual switch element is fabricated and operates as was discussed for switch 70 (see also FIG. 3).

To illustrate how the apparatus of this invention functions to provide access through an interconnect device, such as MIN 10, from one of a plurality of input terminals or stations such as station 20 to any one of a plurality of receiving terminals or stations such as station 33, assume that an operator at station 20 desires to send a data message to station 33. First, station 20 sends the sacrificial routing packet to stage 100 via line 121 to MIN 10. This will result in switch element 141 making a connection through line 122 to switch element 152 in stage 102. In the process of making this connection, the first sacrificial routing message within the packet is absorbed by first stage 100 of the MIN. By allowing the absorption of this routing message, the switch elements (see also FIG. 3) are not required to buffer and forward messages for routing purposes. The specific intermediate connections are determined by the routing algorithm used (see also FIG. 3).

Once the first sacrificial routing message has established a connection to stage 102, the sacrificial routing packet from station 20 containing a second stage 102 routing message travels via line 122 to switch element 152, causing element 152 to make a connection through line 123 to switch element 164. The third routing message within the sacrificial routing packet from station 20 will then be present at third stage 103 on line 123. This last stage 103 routing message will result in switch element 164 making the final connection through line 125 to receiving station 33. When this final connection has been made, the data packet portion of the transmission travels from the user at station 20 directly to receiving station 33 along lines 121, 122, 123, and 125, which also conveyed the control information.

It should be noted that in the apparatus of this invention the number of routing messages (sometimes called switch configuration messages) required is equal to the number of stages in the multi-stage interconnect network (MIN). Each of the routing messages causes a connection through a single stage, and each routing message is sacrificial, thus transmission of a routing message ends at the stage of the MIN where it actually operates on a switch element. Further, there is no requirement for the queuing and retransmission of any routing message.

It should also be noted that though the above example of FIG. 6 operation utilized three stages in MIN 10, the same operational principles will apply to multi-stage interconnect networks having a different number of stages. For each stage of an MIN only one routing message or switch configuration message is required. Since each of these routing messages is sacrificial and they are used only to configure a path through the MIN, these messages will never appear at the receiving station.

Figure 7:
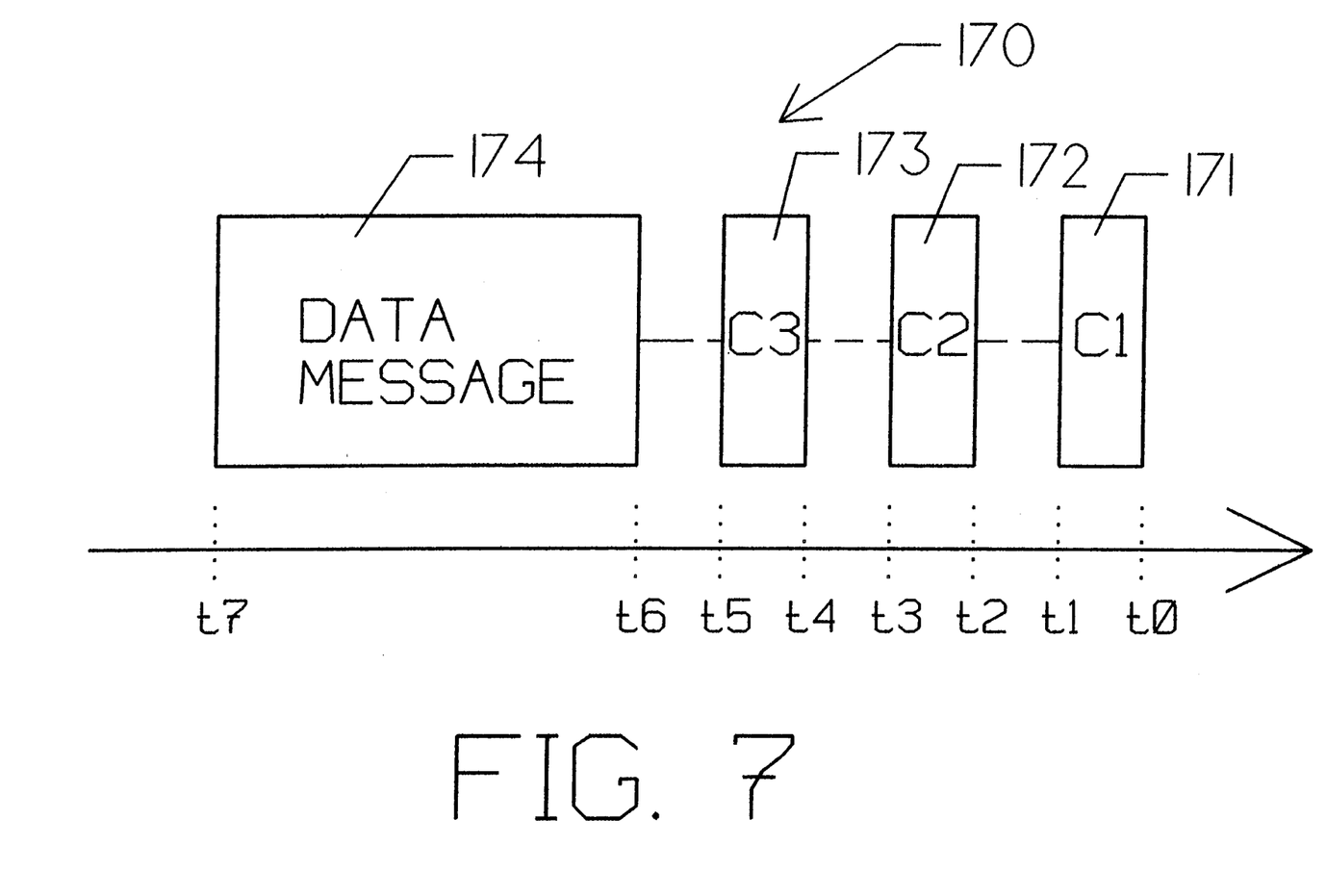
FIG. 7 is a schematic diagram showing the relationship between sacrificial routing messages and the corresponding data message; and, FIG. 8 is a schematic diagram showing the relationship of the messages of FIG. 7 as routed through the MIN.

FIG. 7 is a schematic diagram 170 showing the arrangement of data message 174 in relationship to routing messages 171, 172, and 173 for the three stage switching system of MIN 10 (see also FIG. 6). Each of routing messages 171, 172, and 173 is a separate message containing a switch position definition as its only data element.

For the example shown in FIG. 6, the entire four message packet is presented to MIN 10 via line 121 (see also FIG. 6). Routing message 171 causes switch element 141 to choose line 122 for routing to switch element 152. Similarly, routing messages 172 and 173 cause switch elements 152 and 164 to select lines 123 and 125, respectively. As each routing message is sacrificed at the corresponding switch element, the result is that data message 174 is output from MIN 10 via line 125.

Figure 8:
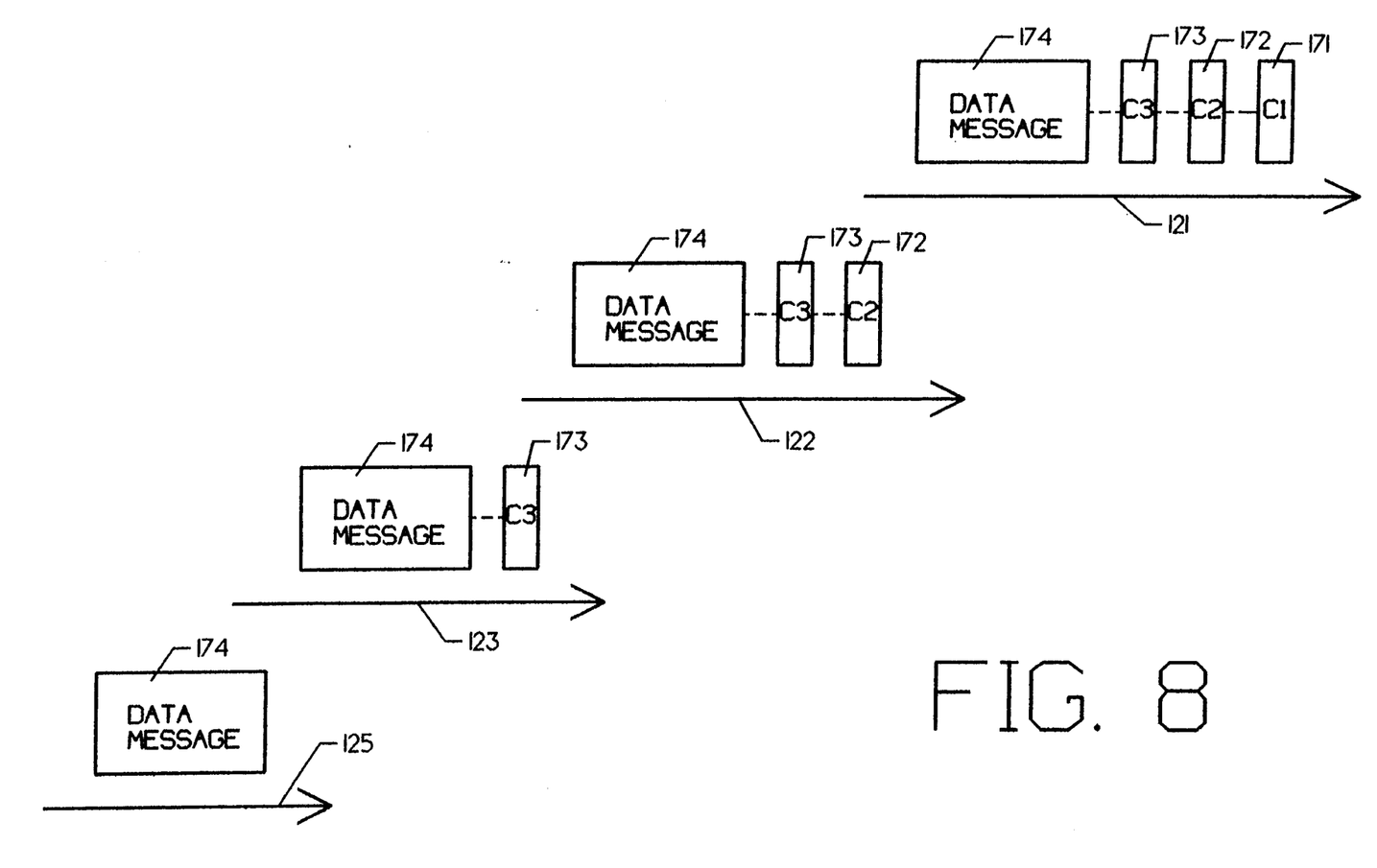

FIG. 8 is a schematic diagram similar to that of FIG. 7 showing what is actually switched on the various lines of MIN 10 (see also FIG. 6). The input to MIN 10 via line 121 contains data message 174, along with routing messages 171, 172, and 173. The output of MIN 10 via line 125 is only data message 174, as shown.

Having thus described the preferred methods and embodiments of the present invention, those of skill in the art will readily appreciate the other useful embodiments within the scope of the claims hereto attached.

I claim:

1. In optical data transfer apparatus, the improvement comprising:
  a. a photonic interconnect network including a plurality of switch stages, each of said switch stages including a plurality of switches, each of said plurality of switches including a plurality of inputs and a plurality of outputs; said outputs of each of said plurality of switches in each of said plurality of switch stages are connected to at least one of said inputs on each of said plurality of switches in the next succeeding stage of said plurality of switch stages;
  b. a sending terminal including a routing controller for selectively providing a plurality of sacrificial routing messages, and including a message source coupled to a first stage of said plurality of switch stages for providing a data message thereto, and further including a switch controller coupled to said plurality of switches for selectively connecting said sending terminal to one of said inputs on said plurality of switches in said first stage of said plurality of switch stages; and, c. a receiving terminal including a coupling means coupled to said receiving terminal and to said plurality of switches for connecting said receiving terminal to a select one of said outputs on a selected one of said plurality of switches in the last stage of said plurality of switch stages, for receiving said data message.

2. An apparatus according to claim 1 wherein the number of said plurality of sacrificial routing messages is equal to the number of stages in said plurality of switch stages.

3. An apparatus according to claim 2 wherein each of said routing messages is sent to one selected switch of said plurality of switches in each stage of said plurality of switch stages, and each of said routing messages is sacrificed at the selected one of said switches.

4. An apparatus according to claims 1, 2 or 3 wherein said switch comprises:
   a. a routing message decoder;
   b. a crossbar switch; and,
   c. a switch controller connected between said decoder and said crossbar switch for toggling said switch in response to a decoded routing message.

5. An apparatus according to claim 4 wherein said switch further comprises a bi-directional crossbar switch.

6. A method of transferring data through a multi-stage interconnect network, which network includes a plurality of switches in each stage, comprising the steps of:
   a. providing a plurality of switch configuration messages;
   b. sending a different message of said plurality of configuration messages to only one selected switch in each plurality of switches in each stage of said network;
   c. sacrificing each of said switch configuration message after said switch configuration message has configured said one selected switch; and,
   d. sending data through said multi-stage interconnect network along the path created by said newly configured switches.

7. A method according to claim 6 including the step of providing one of said switch configuration messages for each of said stages.

8. A method of establishing a transfer path through a multi-stage interconnect network which network includes a plurality of stages, and each stage includes a plurality of switches, comprising the steps of:
   a. providing a first sacrificial routing message to a first selected switch of said plurality of switches in a first of said plurality of stages;
   b. providing a second sacrificial routing message through said first selected switch to a second selected switch of said plurality of switches in a second of said plurality of stages;
   c. providing a third sacrificial routing message through said first and said second selected switches to a third selected switch of said plurality of switches in a third of said plurality of stages; and,
   d. providing further sacrificial routing messages as needed to select a final switch of said plurality of switches in a final stage of said plurality of stages, each of said further routing messages passing through all previously selected switches to a further selected switch of the plurality of switches in a next succeeding stage of said plurality of stages.

9. In a system for the transfer of data messages through a multi-stage interconnect network having L through n stages and a plurality of switches in each stage, the apparatus comprising:
   a. a message origination station for sending a data message through said interconnect network and for sending a plurality of sacrificial routing messages to determine a path through said network for said data message;
   b. first routing means for routing a first of said routing messages to a first selected switch of said plurality of switches in a first of said stages;
   c. second routing means for routing a second of said routing messages through said first selected switch to a second selected switch of said plurality of switches in a second of said stages; and,
   d. a path for connecting an nth of said routing messages through n+1 of said selected switches to an nth selected switch of said plurality of switches in the nth of said stages.

* * * * *